Patented June 12, 1934

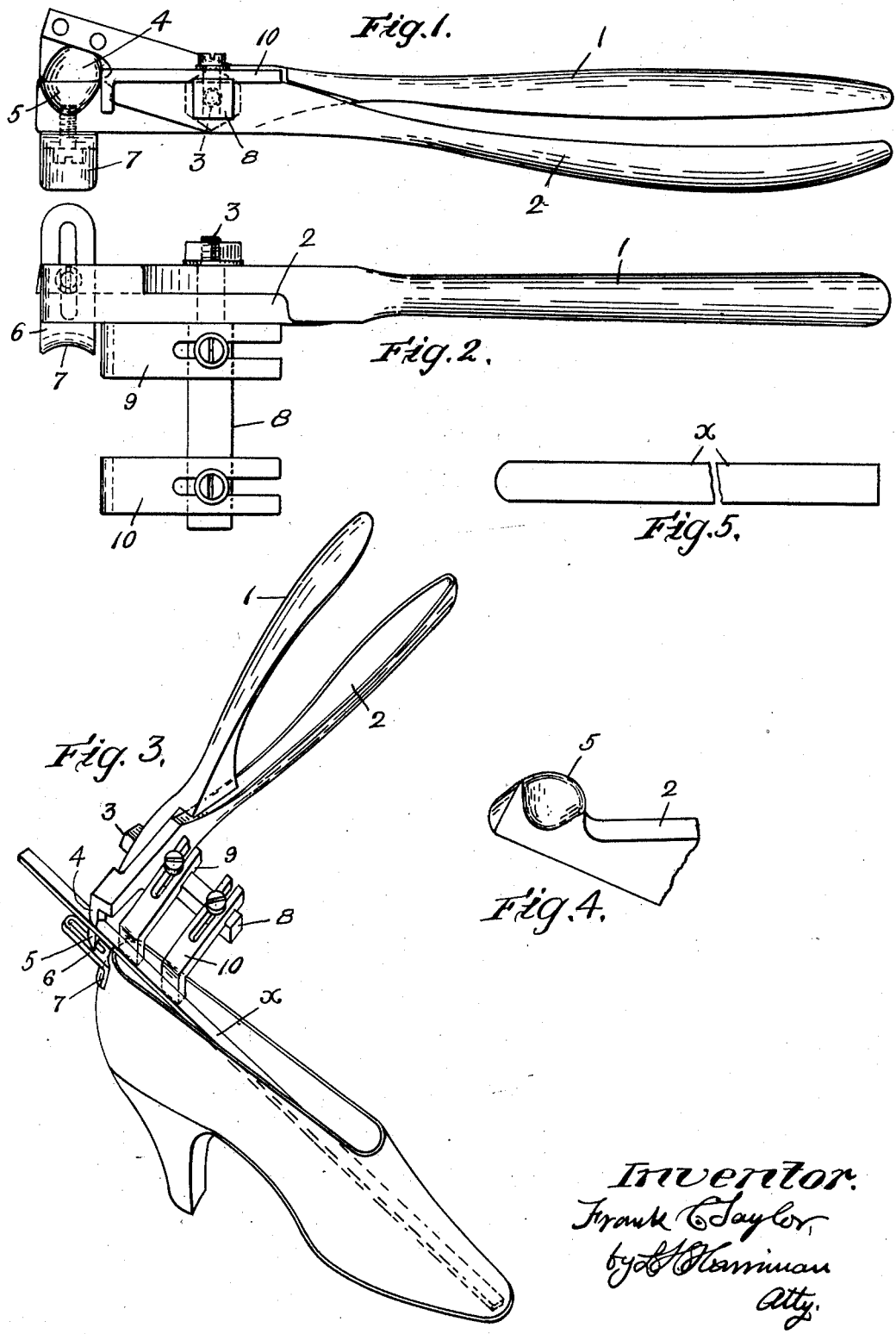
June 12, 1934.  F. C. TAYLOR  1,962,624
SHOE TREE STICK CUTTER
Filed July 13, 1932

1,962,624

UNITED STATES PATENT OFFICE 1,962,624

SHOE TREE STICK CUTTER

Frank C. Taylor, Haverhill, Mass.

Application July 13, 1932, Serial No. 622,256

2 Claims. (Cl. 164—81)

This invention relates to hand cutting tools, and more particularly to a tool designed for the special purpose of cutting shoe tree sticks to a length suitable for insertion in a particular shoe.

In the manufacture of women's shoes or slippers, it is customary, after the shoe has been finished, or practically finished, to hold the shoe in shape by inserting a narrow strip of resilient material therein which engages the tip of the shoe at one end and the back thereof at the opposite end. These strips are usually made from bamboo, or similar material and are supplied to the manufacturer in bundles of uniform length, so that it is usually necessary to reduce the length to some extent for a particular shoe.

In order that the stick may perform the function of a shoe tree satisfactorily in a particular shoe, the length thereof should be accurately proportioned to the length of the shoe in which it is to be inserted, and some loss, delay or inconvenience is frequently occasioned by reason of the fact that these sticks are not cut to the correct length for a particular use, this being due to the fact that the operator who fits them has no guide for determining the exact length required.

I have also ascertained that where the stick is cut off so that the end is square with the side edges, the sharp corners which are left frequently cause some damage to the heel end of the shoe, and I have further ascertained that if the ends of these sticks are rounded when cut to length, damage from this source will ordinarily be eliminated.

The objects of my invention are to provide a form a hand-cutting tool which will enable the operator to cut shoe tree sticks, of the character above referred to, into the exact lengths required for the particular shoes in which they are to be inserted, and to enable this work to be rapidly performed. Also to provide a tool which will enable the operator to cut off a stick in a manner to provide the stick with a rounded end, so that damage to the shoe on account of sharp corners is likely to be averted.

I accomplish these objects by providing a hand-cutting tool, having curved blades and provided with suitable gages which engage the shoe and the stick to be cut, so that the exact point at which the cut should be made may be quickly determined, and the stick will be held in a position in which its end which is cut will be accurately rounded.

For a more complete disclosure of the invention reference is made to the following specification, in connection with the accompanying drawing in which:

Figs. 1 and 2 are respectively, side and top plan views of a tool embodying my invention.

Fig. 3 is a perspective view illustrating the manner of use of the tool.

Fig. 4 is a detail view of one of the cutting jaws.

Fig. 5 is a detail view of a shoe tree stick after it has been cut to size.

As shown in the drawing, the tool embodying my invention is of the general character of an ordinary pair of cutting pliers and comprises a pair of handles 1 and 2 connected by a pivot 3, said handles having semi-circularly formed cutting jaws 4 and 5, respectively. These jaws may be of the shearing types, or of the type which meet edge to edge, which latter type is shown, as it is preferable for the particular character of work which is to be performed.

According to my invention, I provide the jaw 5, which is lowermost when the tool is held in the normal cutting position, with a gage 6, which is mounted for adjustment at right angles to the jaw and is provided with a concave face 7, which is adapted to be held in a position at one side of the jaw and at the opposite side from the convex surface of the edge of the jaw, in which position the face 7 extends in approximate parallelism with the cutting edges of the jaws and may be held against the back side of the heel part of the shoe while the tool is held in the natural position for cutting.

An arm 8 is mounted on the jaw 4 adjacent to pivot 3 and extends at right angles thereto and a pair of gages 9 and 10 are mounted on said arm and arranged for adjustment transversely thereof, said gages being provided with faces at their ends which are arranged to be held in alignment, at the same side of the tool as that at which the guide face 7 is held.

In using the device a stick $x$ of resilient material, as bamboo, is provided, the length of which may be assumed to be somewhat greater than that required for a particular shoe. The stick is inserted in the shoe until one end engages its tip end and the opposite end portion extends over its back edge, then the tool is held at right angles to the stick with the latter between the cutting jaws thereof and the gage face 7 is held against the back side of the shoe, so that the cutting edges of the jaws 4, 5 are positioned at a predetermined distance from the back of the shoe. At the same time one edge of the stick is held against the end faces of the gages 9 and 10, so that the stick will be correctly positioned on the jaw 5, as shown in Fig. 3, and then the handles will be pressed together, so that the stick will be cut off and be provided with a rounded end, as indicated in Fig. 5.

The stick will then be sprung, so that its rounded end may be engaged with the inner side of the back of the shoe, thereby causing longitudinal pressure to be applied to the shoe so as to hold it in shape.

In practice the gage 6 may be set in a position in which the jaws will be held at such a distance from the back side of the shoe that the stick will be cut to a length suitable for several different sizes of shoes, the extent to which the stick, when not flexed, extends beyond the back side of the shoe corresponding to the extra length necessary to secure the desired pressure between the ends of the shoes. The gages 9 and 10 also are set to correspond to the width of the stick so that the rounding of the end thereof will be symmetrical with the side edges.

I claim:

1. A shoe tree stick cutter comprising a pair of pivotally connected convexly curved cutting jaws arranged for manual operation one above the other and having two gages thereon, one arranged beneath and in front of the lowermost jaw and having its face extending in approximate parallelism with the cutting edge thereof, to position the jaws with relation to the back of a shoe, and the other arranged in front of said jaws with its face approximately perpendicular to the cutting edges thereof, and arranged for adjustment to position the stick laterally with relation to the curvature thereof, so that the convexity of the end of the stick when cut will be symmetrical with its edges.

2. A shoe tree stick cutter comprising a pair of pivotally connected cutting jaws arranged for manual operation one above the other and having two gages thereon, one arranged beneath and in front of the lowermost jaw and having its face extending in approximate parallelism with the cutting edge thereof, to position the jaws with relation to the back of a shoe, and the other arranged in front of said jaws and having its face approximately perpendicular to the cutting edge thereof, to position the stick laterally with relation thereto, and means permitting adjustment of said gages in directions perpendicular to the respective faces thereof.

FRANK C. TAYLOR.